United States Patent [19]

Smith

[11] 3,874,344

[45] Apr. 1, 1975

[54] SELF-MAINTAINING POULTRY WATERER

[76] Inventor: Fred R. Smith, P. O. Box 265, Comer, Ga. 30629

[22] Filed: Dec. 3, 1973

[21] Appl. No.: 421,147

[52] U.S. Cl. .................................................. 119/78
[51] Int. Cl. .............................................. A01k 7/02
[58] Field of Search ................... 119/78, 79, 80, 75; 137/448

[56] References Cited
UNITED STATES PATENTS

| 564,635 | 7/1896 | North et al. | 119/79 |
| 3,095,896 | 7/1963 | Ross | 137/448 |
| 3,138,140 | 6/1964 | Byrd | 119/80 |
| 3,181,558 | 5/1965 | Straub | 119/78 X |
| 3,505,978 | 4/1970 | Nilsen | 119/75 |

Primary Examiner—Hugh R. Chamblee
Attorney, Agent, or Firm—Smith, Harding, Earley & Follmer

[57] ABSTRACT

Water level is maintained in a poultry waterer by means of a float-operated valve of the type comprising a water discharge port, a valve seat surrounding the discharge port on the upstream side, a valve pin extending through the port and having an annular valve seal disposed at its end on the upstream side of the discharge port, the valve seal being arranged to cooperate with the seat, and the valve pin having a float secured to its opposite end.

5 Claims, 3 Drawing Figures

SELF-MAINTAINING POULTRY WATERER

BACKGROUND OF THE INVENTION

This invention relates to poultry watering and particularly to a self-maintaining poultry waterer adapted for connection to a water supply line and having means to maintain a substantially constant water level irrespective of the demand.

Numerous different poultry waterers of the self-maintaining type have been proposed, some involving float-operated valves such as disclosed, for example, in Godshalk U.S. Pat. No. 3,310,065, issued Mar. 21, 1967, others involving fowl-actuated valves such as those disclosed in U.S. Pat. No. 3,428,028, issued Feb. 18, 1969 to H. W. Hart, U.S. Pat. No. 3,483,847, issued Dec. 16, 1969 to H. J. Kneubuehl and U.S. Pat. No. 3,440,852, issued Sept. 12, 1967 to N. P. Nilsen.

Many of the float-operated valves, of which that shown in the Godshalk patent is typical, are both complex in structure and subject to clogging by feed. Many of the fowl-actuated level-maintaining valves are also subject to clogging, the valve in the Nilsen patent being a notable exception. In Nilsen, the valve comprises a downwardly facing valve seat surrounding a discharge port and a valve stem having an annular seal at its lower end extending loosely through the port, the annular seal being engageable with the seat. At the upper end of the stem, which is located within a cup, there is provided a pecking target for actuation of the valve. The valve, described in the Nilsen patent is a very superior type of valve from the standpoint of simplicity of structure and resistance to clogging. However, as is the case with the other fowl-actuated waterers, it is not entirely suitable for debeaked chicks. The fact that the valve mechanism in the Nilsen patent extends upwardly through the bottom of a watering cup requires the watering cup to be a substantial distance off the floor, and hence, unless the components of the Nilsen apparatus are reduced to a miniature size or a suitable platform is provided, the Nilsen watering system cannot be used for baby chicks.

The principal object of this invention is to provide a structurally simple and reliable waterer, utilizing a float for actuating a valve, thereby avoiding the use of fowl-actuated targets. In accordance with the invention, a container comprising a relatively shallow dish is provided with a barrier wall extending upwardly from the bottom of the container to divide it into two sections, one accessible to the fowl and the other inaccessible. One or more passages are provided near the bottom of the barrier to permit the flow of water from the one section to the other. Water is delivered through a conduit to a valve, arranged to deliver water from the conduit to the section which is inaccessible to the fowl. The valve comprises a discharge port, a valve seat surrounding the discharge port on the upstream side, a valve pin extending through the port and having an annular valve seal disposed at its end on the upstream side of the discharge port, the valve seal being arranged to cooperate with the valve seat to close off the flow of water through the discharge port. A float, secured to the opposite end of the valve pin, rests on the water in the inaccessible section, and the float, valve pin and valve seal are so arranged that, at a particular water level in the container, the valve seal will be held against the valve seat by the pressure of the water in the conduit so that the flow of water into the container is cut off by the valve to maintain the substantially constant water level. An overhanging stop is provided to prevent the valve stem from passing through the position in which the flow of water is shut off by the valve. Thus, if a small leak develops in the valve, the float will not rise substantially above its normal position.

The waterer in accordance with the invention is extremely simple in structure and easily maintained. It can be used to start baby chicks and can be raised in height as they grow.

Various objects other than those specifically discussed will appear from the following description when read in conjunction with the drawings.

DETAILED DESCRIPTION

Figure 1:
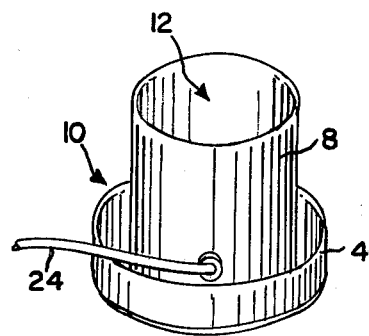
FIG. 1 is a perspective view of a waterer in accordance with the invention.
Figure 2:
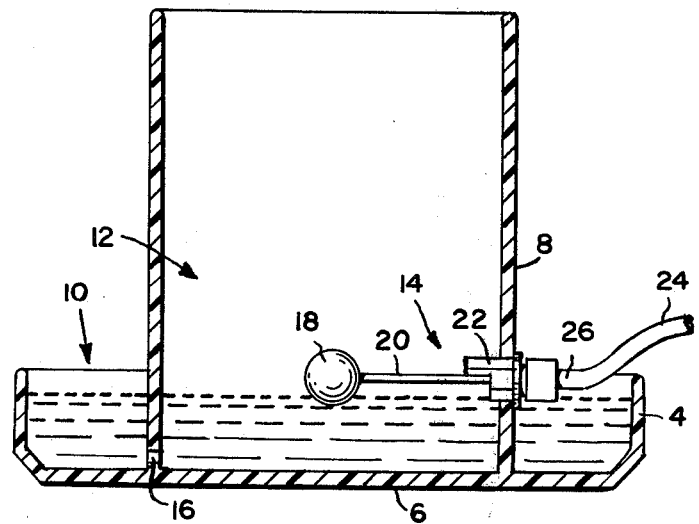
FIG. 2 is a vertical section of the waterer.

In FIGS. 1 and 2, there is shown a relatively shallow dish 4 having a flat bottom 6 and a cylindrical barrier wall 8 extending upwardly from the bottom of the dish. The dish and barrier wall are integral with each other and composed of molded plastic. The barrier wall divides the waterer into an outer section 10 and an inner section 12, the latter being inaccessible to the fowl in order to prevent their interference with the operation of the float and valve combination 14 contained therein. Near the bottom of barrier wall 8, an opening 16 provides for communication between the two sections of the waterer. Several such openings may be provided.

Figure 3:
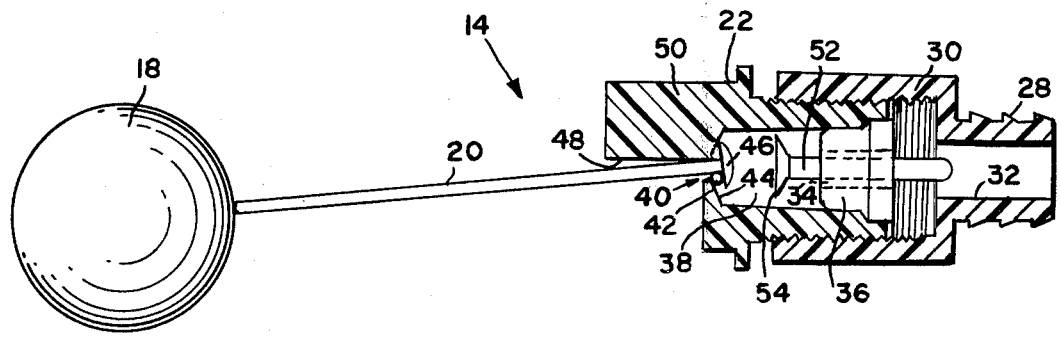
FIG. 3 is a vertical section showing the details of the float and valve mechanism.

The float and valve combination 14, shown in FIGS. 2 and 3 comprises a spherical cork float 18 connected through a valve stem 20 to a valve mechanism 22 which controls the flow of water into interior section 12 of the waterer from a flexible conduit 24. Conduit 24 is connectable to any ordinary supply of water, and its outlet end 26 (FIG. 2) is secured to nipple 28 (FIG. 3) of a fitting 30 which is threadable onto the body of valve mechanism 22. Conduit 24 communicates through passage 32 in fitting 30, and through passage 34 in plug 36 to an interior chamber 38 of valve mechanism 22. Discharge port 40 is shown in an open condition in FIG. 3, but is normally closed off by the cooperation of an annular seal 42 which normally cooperates with conical surface 44, this surface providing a valve seat surrounding a discharge port. Seal 42 is secured to the end valve stem 20, and prevented from sliding off the valve stem by enlargement 46.

The relationship between surface 44 and the seal comprising ring 42 is preferably such that stem 20 is horizontal, as shown in FIG. 2, when the valve is closed. In this position, stem 20 engages downwardly facing surface 48 on the overhanging portion 50 of the valve mechanism. Surface 48 prevents the valve stem moving upwardly from its horizontal position as a result of valve leakage. Thus, even if a small leak develops, the float will not rise substantially above its normal position and further open the valve so as to create an increasingly greater flow into the waterer. The valve stem 20 is axially moveable through discharge port 40, and seal 42 is only held against surface 44 by the pressure of water in chamber 38. Thus, should the flow of water into the conduit 24 be cut off, seal 42 may separate from surface 44. Pin 52 is axially moveable in passage 34 and is provided with an enlarged flared end 54 which is engageable with element 46 at the end of valve stem 20 when pin 52 moves toward the left. When water is turned on, pin 52 is pushed toward the left against element 46 by the action of water passing through passage 34. Flared element 54 at the end of pin 52 pushes against element 46, and insures proper seating of the valve element, which might not otherwise occur particularly if the level of water in the waterer is low at the time the water supply is turned on.

The waterer in accordance with the invention utilizes the simple stem and seal ring type of valve in a float-operated valve mechanism, with a resulting high reliability, simplicity of construction and the ability to control the flow of water into a waterer located at a low vertical level but vertically moveable so as to accommodate baby chicks through the various stages of their growth.

Numerous modifications to the apparatus described in the foregoing may be made. For example, the barrier wall, although desirably a circular cylinder, may be of any desired shape. Likewise, the float and valve mechanism may be arranged so that the stem is normally oblique with respect to the horizontal. Various other modifications may be made from the apparatus specifically disclosed without departing from Applicant's invention as described in the claims.

I claim:

1. A self-maintaining poultry waterer comprising:
a container for water;
conduit means connectable to a supply of water and having an outlet end arranged to deliver water from said conduit means to said container;
valve means at the outlet end of said conduit means, said valve means comprising a discharge port, a valve seat surrounding said discharge port on the upstream side, a valve pin normally extending substantially horizontally through said discharge port and having an annular valve seal disposed at its end on the upstream side of the discharge port, said valve seal being arranged to cooperate with said valve seat to close off the flow of water through said discharge port;
a float secured to the opposite end of said valve pin and adapted to rest on the water in said container, the float, valve pin and valve seal being so arranged that, at a particular water level in the container, the valve seal may be held against the valve seat by the pressure of water in the conduit so that the flow of water into the container is cut off; and
pin means, located on the upstream side of the discharge port and arranged for substantially horizontal sliding movement toward said discharge port, said pin means being responsive to the flow of water through said conduit means when water is turned on for insuring closure of said valve seal against said seat.

2. A waterer according to claim 1 in which the container comprises barrier means dividing said container into accessible and inaccessible sections, the float being located in said inaccessible section.

3. A waterer according to claim 1 in which the container comprises a cylindrical barrier having a substantially vertical wall extending upwardly from the bottom of said container, said wall having at least one opening providing for the flow of water in said container from the interior of said wall to the exterior thereof while preventing the access of fowl to the interior thereof, said float being located within said barrier wall.

4. A waterer according to claim 1 including means for preventing the float from rising above the level in which the valve seal is held against the valve seat.

5. A waterer according to claim 1 including overhanging stop means engageable with said valve pin for preventing the float from rising above the level in which the valve seal is held against the valve seat.

* * * * *